United States Patent [19]

Robieux

[11] 4,330,869
[45] May 18, 1982

[54] SYSTEM OF OPTICAL TELEPHONY

[75] Inventor: Jean Robieux, Chatenay-Malabry, France

[73] Assignee: Societe Anonyme dite: Compagnie Generale d'Electricite, Paris, France

[21] Appl. No.: 217,080

[22] Filed: Dec. 16, 1980

[30] Foreign Application Priority Data

Dec. 28, 1979 [FR] France ................... 79 31979

[51] Int. Cl.³ ............................................. H04B 9/00
[52] U.S. Cl. ........................................ 455/607; 370/3; 455/612
[58] Field of Search ............. 455/612, 617, 607, 610; 370/3; 350/96.16

[56] References Cited

U.S. PATENT DOCUMENTS

| | | |
|---|---|---|
| 2,602,886 | 7/1952 | Fields . |
| 3,455,625 | 7/1969 | Brumley . |
| 3,716,790 | 2/1973 | Romoser . |
| 3,932,023 | 1/1976 | Humer . |
| 3,953,727 | 4/1976 | D'Auria . |
| 3,986,020 | 10/1976 | Kogelnik ................ 370/3 |
| 4,027,153 | 5/1977 | Kach ................... 455/607 |
| 4,227,260 | 10/1980 | Vojvodich ............. 455/607 |
| 4,234,970 | 11/1980 | Beasley ................ 455/607 |
| 4,244,045 | 1/1981 | Nosu ................... 370/3 |
| 4,256,927 | 3/1981 | Treheux ............... 455/607 |

FOREIGN PATENT DOCUMENTS

| | | |
|---|---|---|
| 1495003 | 8/1967 | France . |
| 2298237 | 8/1976 | France . |
| 2337386 | 7/1977 | France . |
| 2399161 | 2/1979 | France . |

OTHER PUBLICATIONS

Applied Optics, vol. 13, No. 11, Nov. 1974.

Primary Examiner—Howard Britton
Attorney, Agent, or Firm—Sughrue, Mion, Zinn, Macpeak and Seas

[57] ABSTRACT

This system includes optical fibers (21,26,49,51) which connect subscriber sets (p,n) to an optical interconnection center (59). An optical frequency $F_p$ and a modulation frequency $f_p$ are ascribed to each subscriber p, these frequencies being specific to the subscriber. The set of each subscriber p includes a laser (19) which delivers a wave (22) of frequency $F_p$ and means (9, 12 to 18) to modulate the amplitude of this wave at the frequency $f_n$ ascribed to the subscriber n with whom he wishes to communicate.

10 Claims, 1 Drawing Figure

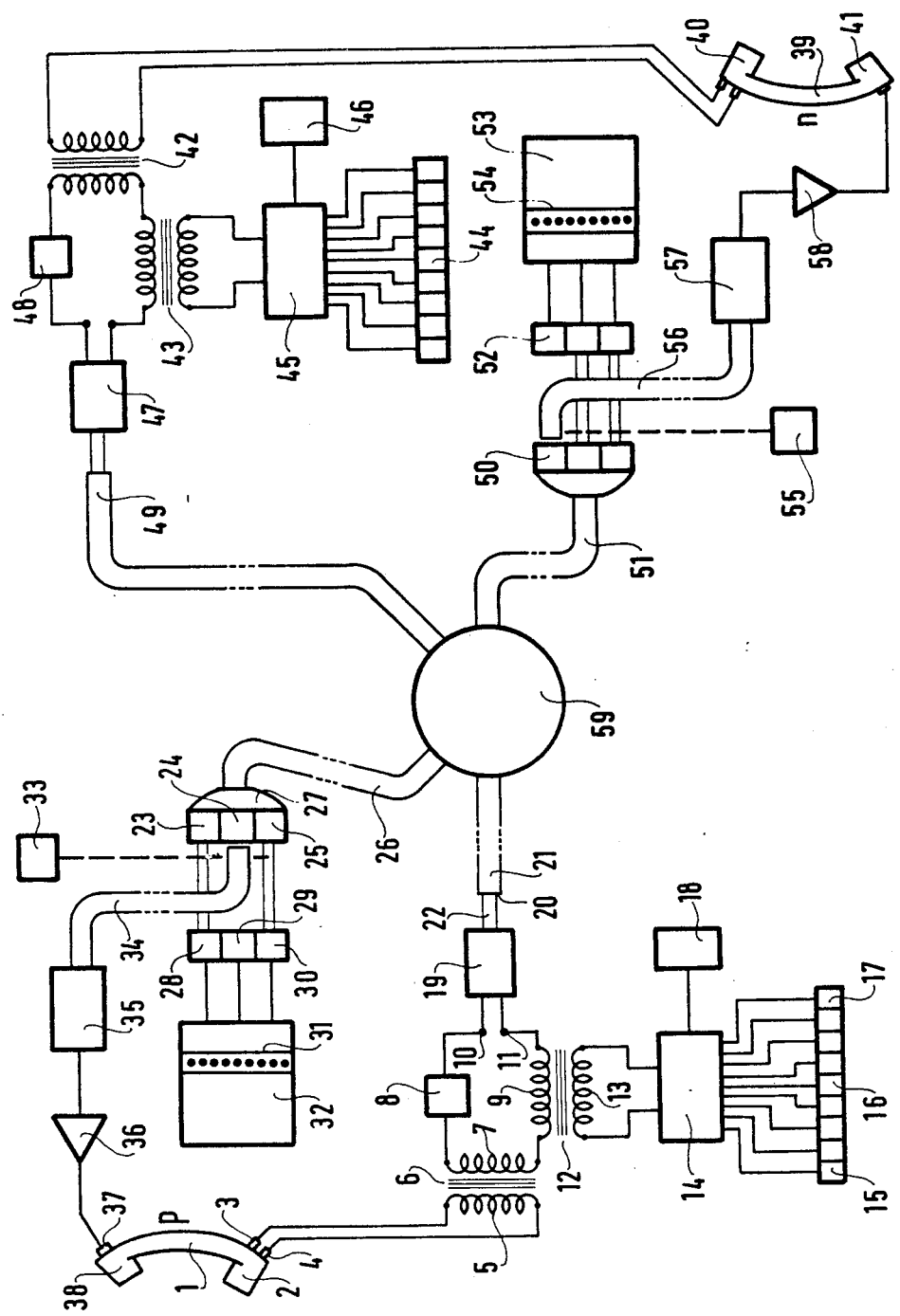

SYSTEM OF OPTICAL TELEPHONY

The present invention relates to a system of optical telephony.

BACKGROUND OF THE INVENTION

In currently used systems of telephony, each subscriber has a telephone set which includes a microphone capable of converting an acoustic signal into an electric signal and an earphone capable of converting an electric signal into an acoustic signal. The various telephone sets are connected by electric wires to an electric switching centre. Each telephone set includes selection means, e.g. of the well-known rotary dial type, so that each subscriber can use his telephone set to generate a signal which is characteristic of another subscriber with whom he wishes to communicate. This signal is transmitted to the switching centre which includes e.g. a ringing system to alert the called subscriber so that the calling and called subscribers can communicate with each other.

Since the discovery of low loss optical fibres and of semiconductor lasers operating at ambient temperature, tests have been made using optical channels for transmitting data from each subscriber telephone set to a switching centre. To transmit data, each telephone set includes a semiconductor laser which emits a light wave at one end of an optical "send" fibre whose other end is connected to the switching centre. Each telephone set further includes means for modulating the amplitude of the emitted light wave by the frequency of the electric signal delivered by the microphone as well as means for demodulating the optical signal transmitted to the telephone set from the switching centre via an optical "receive" fibre. The optical send and receive fibres of each telephone set are connected at their remote ends to the switching centre via electro-optical transducers which convert the modulated optical signals into electric signals and vice-versa. The switching centre remains absolutely identical to electric switching centres currently used in electric telephony systems.

The disadvantage of the above-described system of optical telephony is that its electric switching centre is complex and expensive and that it requires electro-optical transducers for each fibre connected to the switching centre.

Preferred embodiments of the present invention mitigate this disadvantage and produce a particularly simple system of optical telephony in which switching is also performed by optical means.

SUMMARY OF THE INVENTION

The present invention provides a system of optical telephony which is capable of putting N subscribers in communication with one another, said systems including:

N telephone sets ascribed respectively to the N subscribers, each set including a microphone into which a subscriber speaks and which delivers in return an electric send signal, an earphone which receives an electric receive signal and which delivers in return an acoustic signal received by the subscriber, a laser generator which is capable of delivering a send light wave, means for modulating the amplitude of the send light wave by the frequency of said electric send signal, and a photoelectric receiver which receives a receive light wave and is capable of delivering in return said electric receive signal at whose frequency the amplitude of said receive wave is modulated;

N pairs of optical fibres connected to respective ones of the telephone sets of the N subscribers, each pair including a send optical fibre and a receive optical fibre, a first end of the send optical fibre receiving said send light wave, the receive optical fibre transmitting said receive light wave and delivering it at the second end of the send optical fibre to said photoelectric receiver; and an interconnection centre to which said second ends of the N pairs of optical fibres are connected, wherein said interconnection centre is a volume whose surface is formed at least partially by the surfaces of said second ends of the N pairs of optical fibres; and wherein different optical frequencies $F_1 \ldots F_N$ are ascribed to respective subscribers, modulation frequencies $f_1 \ldots f_N$ which are different from one another being ascribe to respective subscribers the modulation frequencies being lower than the optical frequencies;

subscriber p's laser generator delivers a send light wave of frequency $F_p$ ascribed to subscriber p;

subscriber p's telephone set further includes:
- means for modulating the amplitude of said send light wave of frequency $F_p$ by the modulation frequency $f_n$ ascribed to subscriber n;
- $N-1$ optical filters capable of passing only frequencies $F_1, F_{p-1}, F_{p+1} \ldots F_N$, respectively, the input of each of these optical filters being disposed to receive said receive light waves;
- $N-1$ selective electro-optical detectors which receive the light energy that emerges from respective ones of the $N-1$ optical filters, these detectors delivering an electric signal only if the amplitude of the light energy they receive is modulated at the frequency $f_p$;
- means which receive the electric signals delivered by said selective detectors, said means being capable of informing subscriber p of the order n of the filter of frequency $F_n$ whose output radiation is causing the emission of an electric signal from the selective detector which receives said output radiation; and
- an optical conductor one of whose ends is disposed on the input surface of said photoelectric receiver and means for disposing the other end of said optical conductor on the output of said optical filter of frequency $F_n$.

BRIEF DESCRIPTION OF THE DRAWING

An embodiment of the system telephony in accordance with the present invention is described hereinbelow by way of example with reference to the sole diagrammatic FIGURE of the accompanying drawing.

DESCRIPTION OF PREFERRED EMBODIMENT

The FIGURE illustrates a system of optical telephony by which N subscribers may be put in communication with one another, where N may be about 100. To simplify the FIGURE two of the telephone sets for a 10-subscriber system are illustrated therein. An ordinal number in the range 1 to N is ascribed to each subscriber.

Each subscriber has a current type of apparatus here called a handset which has a microphone and an earphone. For example, the subscriber whose order number is p has a handset 1 with a microphone 2 into which he speaks. The microphone 2 delivers an electric signal at its output terminals 3 and 4 which signal is representative of words uttered. The ends of a primary winding 5 of a transformer 6 are connected to the two terminals 3 and 4. Secondary winding 7 of the transformer 6 is connected in series with a low-voltage DC source 8 and with a winding 9 so as to form a branch whose ends are connected to two terminals 10 and 11. The winding 9 is the secondary winding of a transformer 12 which has the ends of its primary winding 13 connected to a connection circuit 14. The outputs of N−1 electric generators such as 15, 16 and 17 are connected to the connection circuit 14. The electric output of an electromechanical selector 18 which can be of a known type with a rotating dial as used in telephone installations is also connected to the connection circuit 14.

The two electrodes of a semiconductor laser 19 which preferably operates at ambient temperature are connected to terminals 10 and 11. An end surface 20 of an optical fibre 21 is disposed so as to receive a light wave 22 emitted by the laser 19.

The subscriber p's telephone installation further includes N−1 optical filters such as 23, 24 and 25 which are placed side-by-side in parallel so that their input surfaces form a plane surface which is as small as possible.

In the example illustrated in the FIGURE, there are 9 filters which are disposed so that said plane surface is a square which is vertical relative to the plane of the FIGURE so that only three filters which form one side of the square are visible.

Said square surface receives the radiation which emerges from an end surface of an optical fibre 26 via an optical connection member 27. The output surfaces of the optical filters thus form a small plane surface. The input surfaces of N−1 selective electro-optical detectors such as 28, 29 and 30 are disposed respectively facing the output surfaces of these optical surfaces. The electric outputs of these detectors are connected via N−1 indicator lights 31 to an electric ringing system 32.

A mechanical control device 33 allows one end surface of an optical fibre 34 to be disposed on the output surface of any one of the filters 23 to 25. The other end surface of the fibre 34 is disposed against the input surface of a photoelectric receiver 35 whose electric output is connected via an amplifier 36 to input 37 of earphone 38 of the handset 1.

Likewise, subscriber n's installation is absolutely analogous to that of subscriber p and includes a handset 39 with a microphone 40 and an earphone 41.

The emission part of subscriber n's installation includes a transformer 42 whose primary winding is connected to the microphone 40 and a transformer 43 whose primary winding is fed by N−1 electric generators such as 44 via a connection circuit 45 controlled by a selector 46. The electrodes of a semiconductor laser 47 are connected respectively to the ends of a branch which includes a DC generator 48 in series with the secondary windings of the transformers 42 and 43. The light beam emitted by the laser 47 is received by an end surface of an optical fibre 49.

The receiver part of subscriber n's installation includes N−1 optical filters such as 50 whose input surfaces receive the light beam which emerges from an end surface of an optical fibre 51. Selective electro-optical detectors such as 52 receive the light beams which emerge from the filters 50 and their electric outputs are connected to an electric ringing unit 53 via a panel of indicator lights 54. A mechanical control unit 55 allows one end surface of an optical fibre 56 to be disposed against the output surface of a filter 50, the other end surface of said fibre being disposed against the optical input surface of an electro-optical receiver 57 whose electric output is connected to the earphone 41 via an amplifier 58.

The other end surfaces of the fibres 21, 26, 49, 51, as well as the corresponding end surfaces of the other optical fibres not illustrated leading to the electric installations of the other subscribers are disposed one beside another so as to form a surface which delimits as small an interconnection volume 59 as possible. This volume can be a sphere or a cube, for example. It can be filled with a substance whose index of refraction is close to that of the optical fibres. This substance can be a liquid or a glass, for example.

The system of optical telephony described hereinabove and illustrated in the FIGURE operates as follows.

A send carrier frequency chosen in the optical spectrum is ascribed to each subscriber. Thus, a frequency $F_p$ is ascribed to subscriber p and a frequency $F_n$ is ascribed to subscriber n. The various frequencies $F_1 \ldots F_N$ are, for example, separated from one another by equal gaps.

Also, a modulation frequency is ascribed to each subscriber. Of course, the modulation frequencies are much lower than the send carrier frequencies. The various modulation frequencies $f_1 \ldots f_N$ can be chosen for example in the ultrasonic range and may be separated from one another by equal gaps.

When subscriber p wishes to communicate with subscriber n, he dials his number on the selector 18.

The N−1 electric generators 15 to 17 deliver AC currents whose respective frequencies are $f_1$ to $f_N$, except $f_p$. As soon as the number n is formed on the selector 18, the circuit 14 interconnects the winding 13 and the generator 16 which delivers a current of frequency $f_n$.

The semiconductor laser 19 fed by the generator 8 delivers a light beam of frequency $F_p$ which is specific to the calling subscriber p. The amplitude of this beam is modulated by the frequency $f_n$ specific to the called subscriber n by means frequency $f_n$ specific to the called subscriber n by means of the winding 9 in series in the laser supply circuit.

The optical wave $F_p{}^n$ of frequency $F_p$ modulated at the frequency $f_n$ is transmitted by the optical fibre 21 to the interconnection volume 59. The optical fibre 51 which is also connected to this interconnection volume receives a multiple-frequency wave. Indeed, this wave includes not only part of the wave $F_p{}^n$ but also parts of the various other waves that may be being emitted from other subscriber sets, not illustrated, and also passing through the interconnection volume 59. The optical wave transmitted by the optical fibre 51 reaches the inputs of the filters 50 which form part of subscriber n's telephone set. The N−1 filters 50 are optical filters which pass only the specific frequencies $F_1 \ldots F_N$, other than $F_n$. These filters are interference type filters and can, for example, be formed mainly by optical gratings. The selective optical detectors 52, of which there are N−1, receive respectively the light beams which emerge from the filters 50. The electric outputs of these detectors deliver current only when the light beams which they receive contain the frequency $f_n$ specific to subscriber n.

Since the optical fibre 51 transmits an optical wave which contains the wave $F_p^n$ emitted by the laser 19, one of the selective detectors, e.g. detector 52, is excited and receives the light beam which emerges from the filter 50 of frequency $F_p$. The electric signal delivered by the detector 52 causes an indicator light 54 to be switched on to show subscriber n that subscriber p is calling. Switching on any of subscriber n's indicator lights causes the electric ringing unit 53 to operate.

By means of unit 55, subscriber n, thus informed, disposes the surface of the free end of optical fibre 56 opposite the output of the filter 50, allowing frequency $F_p$ to pass. Of course, when there is no call, this end of the optical fibre 56 is placed outside the space which lies between the output surface of the filters 50 and the input surface of the receivers, so as not to prevent the light beams from passing from the filters to the receivers. It must be observed that the mechanical devices 33 and 55 can be replaced by automatic devices which receive the electric signals emitted by the selective detectors 28 to 30 or 52.

Knowing that subscriber p is calling, subscriber n dials his number on the selector 46 so as to generate a light wave $F_n^p$ of carrier frequency $F_n$ (specific to subscriber n) at the output of the laser 47, said carrier frequency being modulated at frequency $F_p$ (specific to subscriber p).

This wave $F_n^p$ is transmitted by the fibre 49 to the interconnection volume 59 and is received by the optical filter 26. The indicator light which corresponds to n on the panel 31 is switched on; subscriber p then knows that subscriber n has duly received his ringing signal and is ready for conversation with him. By means of the device 33, he places the free end of fibre 34 opposite filter 24 which allows frequency $F_n$ to pass.

Of course, the wave $F_p$ automatically stops modulating at frequency $f_n$ as soon as subscriber n lifts his handset and conversely, the wave $F_n$ automatically stops modulating at frequency $f_p$ as soon as subscriber n receives subscriber p's ringing signal.

When subscriber p speaks into the microphone 2, the supply current of laser 19 is modulated at the frequency of the words uttered due to the secondary winding 7 of the transformer 6 in series in the supply circuit of the laser 19 which therefore emits a wave $F_p$ modulated at the frequency of the words uttered by subscriber p into the microphone of his handset. This wave is transmitted via the fibre 21, the volume 59, the fibre 51, the filter 50 and the fibre 56 to the input of the receiver 57 where it is demodulated. Subscriber n therefore hears the words uttered by subscriber p after the current delivered by the receiver 57 has passed via the amplifier 58 and the earphone 41.

Likewise, subscriber p hears in his earphone 38 the words which the subscriber n utters into his microphone 40.

Two-way communication is therefore set up between subscriber p and subscriber n.

The system of telephony in accordance with the invention has the following advantages.

The emitters and the receivers can be made by mass production methods used in the semiconductor industry. This reduces their price and greatly increases their reliability.

The connection centre is very simple.

The arrangement can cover a great number of subscribers since the number of optical carrier waves can be very high.

The system of telephony in accordance with the present invention can be used for example on a large industrial site.

I claim:

1. A system of optical telephony which is capable of putting N subscribers in communication with one another, said arrangement including:

N telephone sets ascribed respectively to the N subscribers, each set including a microphone into which a subscriber speaks and which delivers in return an electric send signal, an earphone which receives an electric receive signal and which delivers in return an acoustic signal received by the subscriber, a laser generator which is capable of delivering a send light wave, means for modulating the amplitude of the send light wave by the frequency of said electric send signal, and a photoelectric receiver which receives a receive light wave and is capable of delivering in return said electric receive signal at whose frequency the amplitude of said receive light wave is modulated;

N pairs of optical fibres connected to respective ones of the telephone sets of the N subscribers, each pair including a send optical fibre and a receive optical fibre, a first end of the send optical fibre receiving said send light wave, the receiver optical fibre transmitting said receive light wave and delivering it at the second end of the send optical fibre to said photoelectric receiver; and an interconnection centre to which said second ends of the N pairs of optical fibres are connected, wherein said interconnection centre is a volume whose surface is formed at least partially by the surfaces of said second ends of the N pairs of optical fibres; and wherein different optical frequencies $F_1 \ldots F_N$ are ascribed to respective subscribers, modulation frequencies $F_1 \ldots F_N$ which are different from one another being ascribed to respective subscribers, the modulation frequencies being lower than the optical frequencies;

subscriber p's laser generator delivers a send light wave of frequency $F_p$ ascribed to subscriber p;

subscriber p's telephone set further includes:

means for modulating the amplitude of said send light wave of frequency $F_p$ by the modulation frequency $f_n$ ascribed to subscriber n;

$N-1$ optical filters capable of passing only frequencies $F_1 \ldots, F_{p-1}, F_{p+1} \ldots F_N$ respectively, the input of each of these optical filters being disposed to receive said receive light waves;

$N-1$ selective electro-optical detectors which receive the light energy that emerges from respective ones of the $N-1$ optical filters, these detectors delivering an electric signal only if the amplitude of the light energy they receive is modulated at the frequency $f_p$;

means which receive the electric signals delivered by said selective detectors, said means being capable of informing subscriber p of the order n of the filter of frequency $F_n$ whose output radiation is causing the emission of an electric signal from the selective detector which receives said output radiation; and an optical conductor one of whose ends is disposed on the input surface of said photoelectric receiver and means for disposing the other end of said optical conductor on the output of said optical filter of frequency $F_n$.

2. A system according to claim 1, wherein said laser generator is a semiconductor laser and wherein each set further includes a DC source connected to the electrodes of said laser by a supply circuit.

3. A system according to claim 2, wherein said means for modulating the amplitude of the send light wave by the frequency of said send electric signal include a transformer, having a primary winding whose ends are connected to the output terminals of said microphone and a secondary winding which is connected in series in the supply circuit of the laser.

4. A system according to claim 2, wherein said means for modulating the amplitude of said send light wave of frequency $F_p$ by the modulation frequency $f_n$ ascribed to subscriber n with whom subscriber p wishes to communicate include N−1 electric generators whose respective frequencies are $f_1 \ldots f_{p-1}, f_{p+1} \ldots, f_N$, a transformer with a secondary winding which is connected in series in the supply circuit of the laser and a primary winding which is connected via a connection circuit to the outputs of said N−1 electric generators, and a selector capable of controlling said connection circuit so as to connect the ends of the primary winding of the transformer to the output of the electric generator of frequency $f_n$ ascribed to subscriber n with whom subscriber p wishes to communicate.

5. A system according to claim 1, wherein said interconnection centre is a sphere.

6. A system according to claim 1, wherein said interconnection centre is a cube.

7. A system according to claim 1, wherein said interconnection centre is filled with a substance whose refractive index is close to that of said optical fibres.

8. A system according to claim 7, wherein said substance is a glass.

9. A system according to claim 7, wherein said substance is a liquid.

10. A system according to claim 1, wherein indicator lights are included in said means which receive the electric signals delivered by said selective detectors, for signalling to subscriber p the order n of the filter of frequency $F_n$ whose output radiation causes the emission of an electric signal from the selective detector which receives said output radiation.

* * * * *